US007743906B2

(12) United States Patent
Accettura

(10) Patent No.: US 7,743,906 B2
(45) Date of Patent: Jun. 29, 2010

(54) EGG ORIENTING AND ACCUMULATING SYSTEM WITH FORWARD AND REVERSE INTERCONNECTED CONVEYORS FOR PREVENTING EGG OVERFLOW/RIDE UP AND PRIOR TO EXISTING IN INDIVIDUAL ROWS UPON SPOOL BARS

(75) Inventor: Anthony Accettura, Farmington Hills, MI (US)

(73) Assignee: FPS Food Processing Systems, B.V., Nootdorp (NL)

( * ) Notice: Subject to any disclaimer, the term of this patent is extended or adjusted under 35 U.S.C. 154(b) by 133 days.

(21) Appl. No.: 12/174,861

(22) Filed: Jul. 17, 2008

(65) Prior Publication Data

US 2009/0020395 A1 Jan. 22, 2009

Related U.S. Application Data

(60) Provisional application No. 60/950,267, filed on Jul. 17, 2007.

(51) Int. Cl.
*B65G 47/26* (2006.01)

(52) U.S. Cl. .................... 198/446; 198/452; 198/580

(58) Field of Classification Search ................ 198/495, 198/537, 550.3, 443, 444, 445, 449, 452, 198/453, 580
See application file for complete search history.

(56) References Cited

U.S. PATENT DOCUMENTS

| 2,620,059 | A | * | 12/1952 | Niederer et al. | 198/446 |
|---|---|---|---|---|---|
| 3,100,371 | A | * | 8/1963 | Redmon | 56/16.8 |
| 3,311,216 | A | * | 3/1967 | Jones | 198/444 |
| 3,342,012 | A | * | 9/1967 | Reading | 198/580 |
| 3,592,327 | A |  | 7/1971 | Koch et al. |  |
| 3,650,366 | A |  | 3/1972 | Wyland |  |
| 3,716,127 | A |  | 2/1973 | Loeffler |  |
| 4,042,100 | A | * | 8/1977 | Morrone | 198/446 |
| 4,276,977 | A | * | 7/1981 | van Kattenbroek | 198/446 |
| 4,410,079 | A |  | 10/1983 | Niederer et al. |  |
| 4,932,514 | A | * | 6/1990 | Doppenberg | 198/445 |
| 4,940,129 | A |  | 7/1990 | Walz et al. |  |
| 5,002,016 | A |  | 3/1991 | de Vrieze et al. |  |
| 5,170,879 | A |  | 12/1992 | Smith |  |
| 5,321,491 | A |  | 6/1994 | Summers et al. |  |
| 5,918,726 | A |  | 7/1999 | Temmink et al. |  |

(Continued)

FOREIGN PATENT DOCUMENTS

JP 59151007 A 8/1984

(Continued)

*Primary Examiner*—James R Bidwell
(74) *Attorney, Agent, or Firm*—Gifford, Krass, Sprinkle, Anderson & Citkowski, P.C.

(57) ABSTRACT

A conveying and orienting system for handling eggs including a main conveyor for supporting thereupon a plurality of eggs and for segregating the same into individual file lines prior to delivery to a spool bar conveyor for subsequent egg handling operations. One or more return conveyors are positioned alongside the main conveyor and communicate with the main conveyor at first and second end locations. A control mechanism independently adjusts a travel speed of at least one of the main and return conveyors, this in order to redirect, along the return conveyors for reintroduction onto upstream locations of the main conveyor, a plurality of eggs which exceed of the present handling capabilities of the individual segregating lanes and spool bar.

13 Claims, 5 Drawing Sheets

U.S. PATENT DOCUMENTS

| | | |
|---|---|---|
| 5,937,995 A | 8/1999 | Hartness et al. |
| 6,454,101 B1 | 9/2002 | Doornekamp et al. |
| 6,651,803 B2 * | 11/2003 | Virippil et al. ............ 198/495 |
| 6,776,278 B1 | 8/2004 | Gross et al. |
| 6,811,017 B1 | 11/2004 | Gross et al. |
| 7,000,755 B2 | 2/2006 | van Pinxteren et al. |

FOREIGN PATENT DOCUMENTS

| | | |
|---|---|---|
| JP | 01308711 A | 12/1989 |
| JP | 02035974 A | 2/1990 |
| JP | 04201916 A | 7/1992 |
| JP | 06-115670 A | 4/1994 |
| JP | 07-257735 A | 10/1995 |
| JP | 09-278165 A | 10/1997 |
| JP | 10181857 A | 7/1998 |
| JP | 11-349130 A | 12/1999 |
| JP | 2003180192 A | 7/2003 |
| JP | 2003206016 A | 7/2003 |
| JP | 2003325074 A | 11/2003 |
| WO | WO-2007029316 A1 | 3/2007 |

* cited by examiner

EGG ORIENTING AND ACCUMULATING SYSTEM WITH FORWARD AND REVERSE INTERCONNECTED CONVEYORS FOR PREVENTING EGG OVERFLOW/RIDE UP AND PRIOR TO EXISTING IN INDIVIDUAL ROWS UPON SPOOL BARS

CROSS REFERENCE TO RELATED APPLICATIONS

The present application claims the priority of U.S. Provisional Patent Application Ser. No. 60/950,267, filed Jul. 17, 2007, and entitled EGG ORIENTING AND ACCUMULATING SYSTEM WITH FORWARD AND REVERSE INTERCONNECTED CONVEYORS FOR PREVENTING EGG OVERFLOW/RIDE UP AND PRIOR TO EXITING IN INDIVIDUAL ROWS UPON SPOOL BARS.

BACKGROUND OF THE INVENTION

1. Field of the Invention

The present invention discloses an egg orienting and accumulating system used in transporting large numbers of eggs from a central conveying belt into single file lanes, and for subsequent transfer onto spool bars for delivery to such as another conveyor, egg washer application or the like. More specifically, a main forward conveyor is positioned between a pair of outer and reverse directional conveyors, and which are interconnected in order to prevent overflow or ride-up of the eggs as they are transported from the main central belt to a plurality of individual exit lanes which precede egg handling spool bars for directing the eggs to such as the conveyor, washer or other application.

2. Description of the Prior Art

Egg orienting, conveying and transferring assemblies are known in the art and which are typically utilized in cooperation with various egg washing, sorting and packing applications. Certain conveying assemblies include such as a forward conveyor utilized in combination with a plurality of communicating and individual egg row establishing lanes, these useful in segregating and communicating sub-pluralities of the eggs delivered by the orienting/conveying device to a downstream location associated with a given egg washing/sorting/packing operation.

A problem associated with existing egg conveying apparatuses is the tendency of a too great plurality of eggs conveyed towards the individual row defining lanes to crowd (or ride up) at the lane defining locations. The resultant logjam increases the incidences of jamming and/or breakage of eggs.

Japanese Abstract Publication No. 2003/206016 teaches an egg aligning device and which includes, in relevant part, a first conveyor with an egg density sensor, and a second successive conveyor arranged on an upstream side of the first conveyor and a control means for controlling a driving speed of the second conveyor based upon an output of the first conveyor sensor. In this manner, a variable control speed of the conveyors is determined.

Additional prior art examples of accumulating or orienting systems include Gross et al. U.S. Pat. No. 6,776,278, Hartness U.S. Pat. No. 5,937,995 and Smith U.S. Pat. No. 5,170,879, each of which incorporates a form of narrowing or lane defining apparatus.

SUMMARY OF THE PRESENT INVENTION

The present invention discloses a combined conveying and orienting system for handling large pluralities of eggs and which includes a platform upon which is supported a forward main conveyor for supporting thereupon a plurality of eggs and for segregating the same into individual file lines prior to delivery to a spool bar conveyor for subsequent egg handling operations. A return conveyor, and most typically a pair of return conveyors, are positioned along at least one side (or first and second sides) of the main conveyor and communicate with the main conveyor at first and second end locations. A variable control mechanism independently adjusts a travel speed of at least one of the main and return conveyors, this in order to redirect, along the return conveyors, for reintroduction onto an upstream location of the main conveyor, a plurality of eggs which exceed of the present handling capabilities of the individual segregating lanes and spool bar.

BRIEF DESCRIPTION OF THE DRAWINGS

Reference will now be made to the attached drawing, when read in combination with the following detailed description, wherein like reference numerals refer to like parts throughout the several views, and in which.

DETAILED DESCRIPTION OF THE PREFERRED EMBODIMENTS

Figure 1:
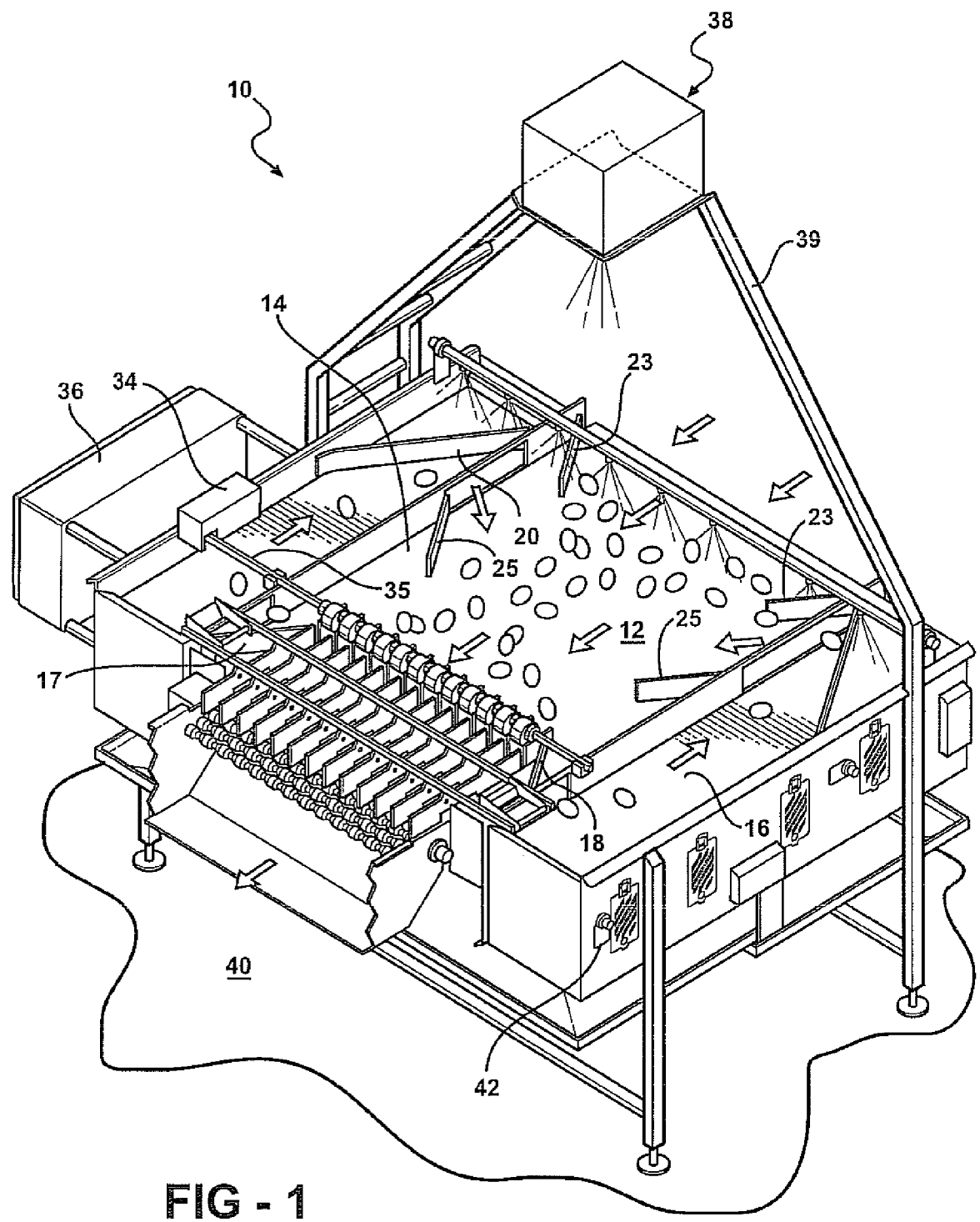
FIG. 1 is a perspective view of the egg orienting/accumulating system according to a preferred embodiment of the present invention.

Referring now to FIGS. 1-5, a series of perspective, plan and overhead views are shown at 10 of an egg orienting/accumulating system according to a preferred embodiment of the present invention. In particular, the present invention discloses an egg orienting and accumulating system used in transporting large numbers of eggs from a central conveying belt into single file lanes, and for subsequent transfer onto spool bars for delivery to such as another conveyor, egg washer application or the like.

The present invention is an improvement over prior art in that it teaches a main forward conveyor 12 positioned between a pair of outer and reverse directional conveyors 14 and 16, these being operated by one or more pulleys and electric motors (not shown). The forward conveyor 12 and reverse conveyors 14 and 16 are interconnected by pairs of angled directional guides, see at 17 & 18 as well as at 20 & 22 as best shown in FIG. 5, and such that an overflow volume of eggs present at the lane dividing location of the main conveyor 12 are redirected to either of the laterally positioned return conveyors 14 and 16 (see at 13) and subsequently re-introduced onto the main conveyor 12 (at 15 also in FIG. 5).

Additional dividers 23 and 25 (see again FIG. 5) are provided in inwardly and angularly extending along first and second opposite sides, and at spaced apart linear locations, associated with the main forward conveyor 12 and, in this manner, to influence an adequate plurality of eggs towards the lane defining dividers, and such that only during the existence of an abundance of eggs are the reverse conveyors employed to redirect the overflow to a rear queue location of the main conveyor. In this fashion, the forward and reverse conveyors act in concert in order to prevent overflow or ride-up of a greater plurality of eggs than can be normally handled by the initial dividers 24, succeeding and individual lanes 24', and downstream located spool bars 26, 28, 30 and 32, as they are transported from the main central belt 12 through the plurality of individual exit lanes 24', the egg handling spool bars 26-32, and for directing the eggs to such as a succeeding conveyor, washer or other application (see as best shown in FIG. 5).

Additional aspects of the egg orientation/accumulation system 10 include the forward 12 and reverse interconnected conveyors 14 and 16 each exhibiting a variable speed independent drive, thus permitting them to be cooperatively or independently adjusted as to speed. A variable speed gear motor, see at 34, is also provided for driving the lane divider motion separately from the forward and reverse conveyor drivers and which can be operated such as from an associated control box or panel 36 which is mounted to a selected side of the frame supported platform upon which the assembly is supported. The variable speed gear motor 34 operates via a crank arm/driveshaft 35, about which the egg dividers 24 are rotated in side-to-side fashion. This variable speed action operates to effectively separate the mass of eggs upon entering the individual lanes and the variable speed drive allows this motion to change, depending upon the dictates of the associated overhead vision system (as subsequently shown and described at 38). In this fashion, greater control can be asserted over the number of eggs which can be loaded onto the main conveyor 12, as well as at what speeds the eggs may be carried to the transfer spools and in order to achieve maximum filled spool pockets.

Figure 2:
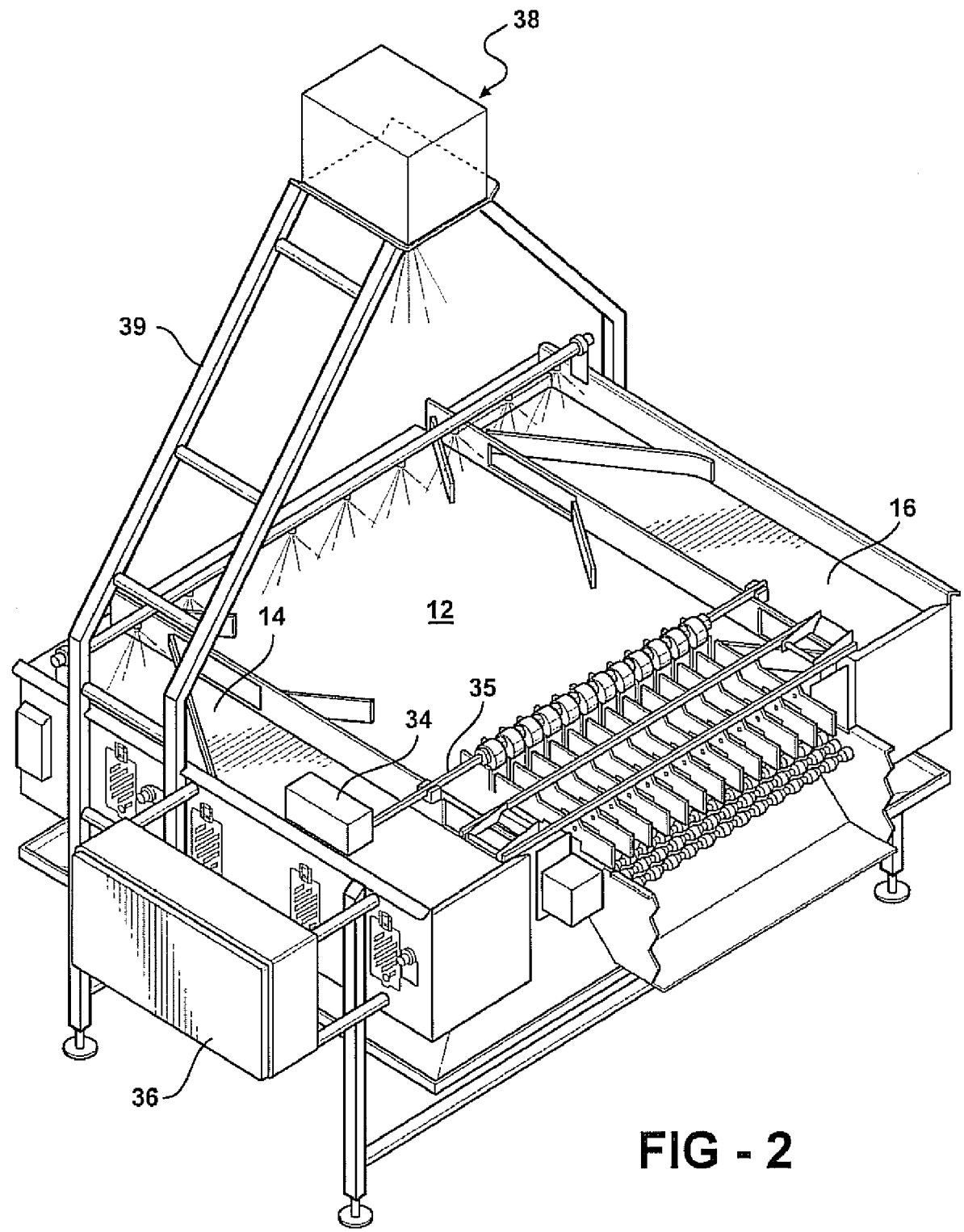
FIG. 2 is a rotated perspective view of the system shown in FIG. 1 and further illustrating the features of the forward and reverse interconnected conveyors with associated control panel mounted to a side of the system frame, overhead vision/egg counting system, and plurality of individual egg defining lanes preceding egg handling spools.
Figure 3:
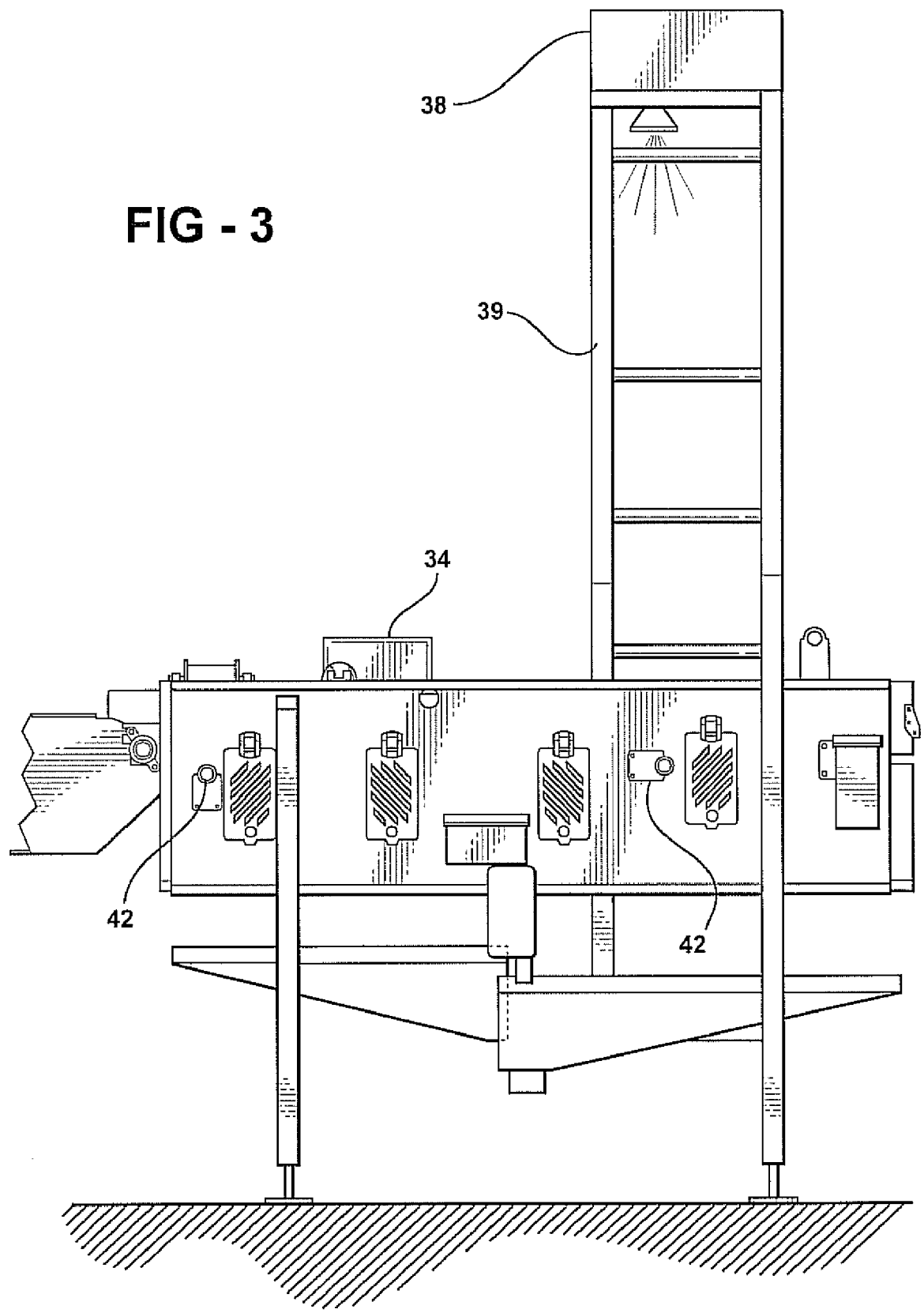
FIG. 3 is a side plan view of the egg orienting system taken from a direction shown in line 3-3 of FIG. 1.
Figure 4:
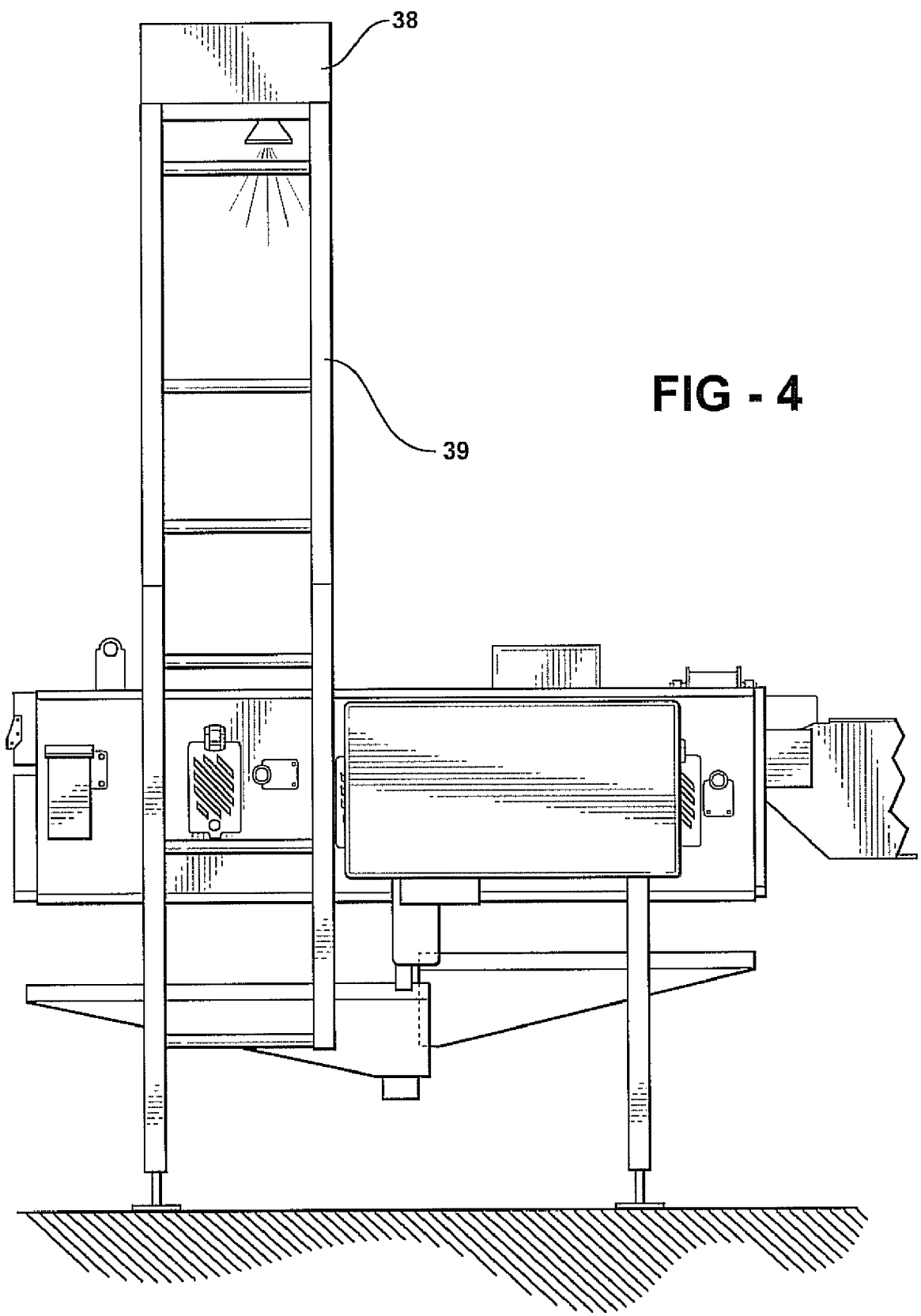
FIG. 4 is a further control box side plan view taken from a direction shown in line 4-4 of FIG. 1.
Figure 5:
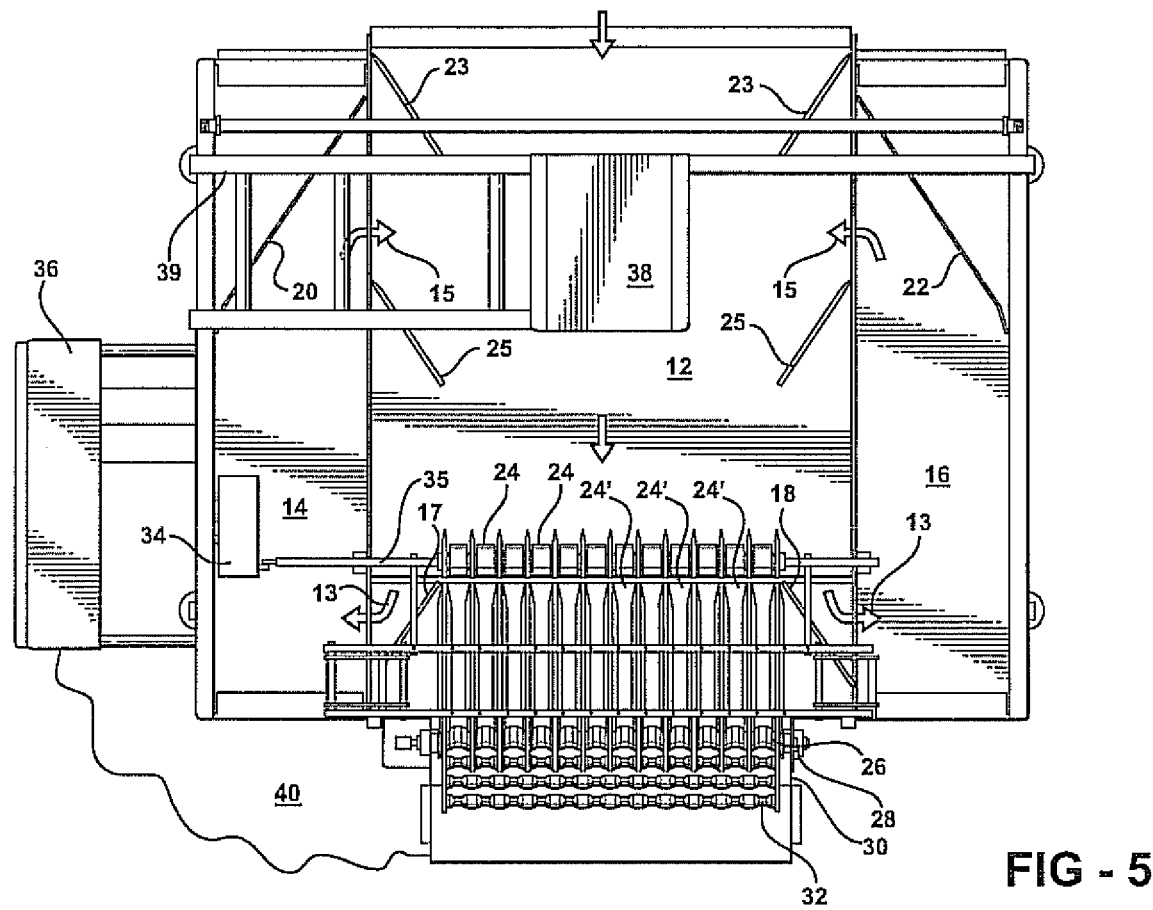
FIG. 5 is an overhead plan view of the egg orienting and accumulating system better illustrating the interconnecting and overflow preventing nature of the central forward and first/second outer perimeter reverse directional ramps.

The associated vision system is generally again referenced at 38 in FIGS. 1, 2 and 5 mounted in generally overhead positioned fashion via a substantially modified "V" shaped superstructure or frame 39, and which operates in concert with the control panel settings in order to 1) control the (variable) speeds of the belts and regulate the flow of eggs in order to achieve maximum filling of the spool pockets; 2) to optionally determine a numerical count of a number of eggs which are supported upon the main forward 12 and/or reverse 14 and 16 conveyors in order to communicate with and control the speeds of the conveyor driving belts; 3) to optionally communicate with the associated egg grader or spool conveyor, see as generally referenced at 40; and 4) to determine if and when any of the lanes 24 are blocked and/or if there are any errors occurring with either of the forward or reverse conveyors.

In addition to the above recited general operating parameters associated with the vision system 38, it is also contemplated that the present system will also employ either vision or other means for detecting the existence of foreign objects (.e.g. non-eggs) entering through the conveyor 12. In this manner, the incidence of mechanical jams occurring downstream along the conveyor line is greatly reduced. Multiple spray pipes/nozzles 42 can be built into the sides of the conveyors and which may be software controlled in order to self clean the conveyors during such times as production breaks, shift end or the like.

Accordingly, the present invention discloses an improved egg orienter or accumulator, such as for incorporation into an egg conveying line, and which facilitates the transport and transition of a mass of open bed/conveyor supported eggs into a plurality of single file lanes for subsequent transport to a spool bar (roller) type conveyor or the like for subsequent egg handling abilities.

Having described my invention, other and additional preferred embodiments will become apparent to those skilled in the art to which it pertains, and without deviating from the scope of the appended claims.

I claim:

1. An egg conveying and orienting system comprising:
   a main conveyor supporting a plurality of eggs and directing the eggs to individual lanes prior to delivery to a spool bar conveyor for at least one subsequent egg handling operation;
   a pair of return conveyors positioned along first and second sides of said main conveyor and communicating with said main conveyor at a first location proximate said lanes and a second upstream location;
   first and second pairs of angled directional guides positioned between said main conveyor and said return conveyors and first and second linear ends of said conveyors corresponding to said communicating first location and second upstream location, such that an overflow volume of eggs at the individual lanes being redirected to either of said laterally positioned return conveyors, and subsequently re-introduced onto said main conveyor; and
   a variable control mechanism independently adjusting a travel speed of at least one of said main and return conveyors and in order to redirect, along said return conveyor for reintroduction at said upstream location of said main conveyor, a plurality of eggs which exceeds of the present handling capabilities of said individual segregating lanes and spool bar.

2. The system as described in claim 1, further comprising additional pairs of inwardly angled dividers provided along first and second opposite sides, at spaced apart linear extending distances associated with said first and second locations associated with said main forward conveyor, to influence an adequate plurality of the eggs towards said individual lanes such that only during the existence of an abundance of eggs are said reverse conveyors employed to redirect the overflow to said second location of said main conveyor.

3. The system as described in claim 1, said variable control mechanism further comprising a variable speed independent drive permitting cooperative or independent adjustment of main and return rollers, and which are driven by an integrated motor built into an associated drive roller operated from an associated control box mounted to a selected side of an assembly platform upon which said conveyors are supported.

4. The system as described in claim 1, further comprising a vision system mounted in overhead fashion relative to at least said main conveyor and communicating with at least said variable control mechanism for individually adjusting forward and return conveyor speeds.

5. The system as described in claim 4, said vision system further comprising at least one of an egg counting, grader/spool conveyor travel speed regulating, and lane blockage sensor capabilities.

6. The system as described in claim 1, further comprising multiple spray pipes and nozzles incorporated into a platform upon which said conveyors are supported and in communication with first and second sides of said conveyors, an associated software control ordering self clean the conveyors during such as production breaks and end of shift times.

7. An egg conveying/orienting system comprising:
   a platform upon which is supported a forward main conveyor for supporting thereupon a plurality of eggs and for segregating the same into individual file lanes prior to delivery to a spool bar conveyor for subsequent egg handling operations;

a pair of return conveyors positioned along first and second sides of said main conveyor and communicating with said main conveyor at first and second end locations; and a variable control mechanism for independently adjusting a travel speed of at least one of said main and return conveyors and in order to redirect, along said return conveyor for reintroduction onto said main conveyor, a plurality of eggs which exceeds of the present handling capabilities of the individual segregating lanes and spool bar, said variable control mechanism further comprising a variable speed independent drive permitting cooperative or independent adjustment of main and return rollers, and which are driven by an integrated motor built into an associated drive roller operated from an associated control box mounted to a selected side of said assembly platform.

8. The system as described in claim 7, further comprising first and second pairs of angled directional guides positioned between said main conveyor and said return conveyors and first and second linear ends of said conveyors, and such that an overflow volume of eggs present at the individual file lanes of said main conveyor are redirected to either of said laterally positioned return conveyors and subsequently re-introduced onto said main conveyor.

9. The system as described in claim 8, further comprising additional pairs of inwardly angled dividers provided along first and second opposite sides, and at spaced apart linear locations, associated with said main forward conveyor and to influence an adequate plurality of the eggs towards said lane defining dividers such that only during the existence of an abundance of eggs are said reverse conveyors employed to redirect the overflow to a rear queue location of said main conveyor.

10. The system as described in claim 7, further comprising a vision system mounted in overhead fashion relative to at least said main conveyor and communicating with at least said variable control mechanism for individually adjusting forward and return conveyor speeds.

11. The system as described in claim 10, said vision system further comprising at least one of an egg counting, grader/spool conveyor travel speed regulating, and lane blockage sensor capabilities.

12. The system as described in claim 7, further comprising multiple spray pipes and nozzles incorporated into said platform in communication with first and second sides of said conveyors, an associated software control ordering self clean the conveyors during such as production breaks and end of shift times.

13. An egg conveying and orienting system comprising:

a main conveyor supporting a plurality of eggs and directing the eggs to individual lanes prior to delivery to a spool bar conveyor for at least one subsequent egg handling operation;

a pair of return directional conveyors positioned along first and second sides of said main conveyor and communicating with said main conveyor at a first location proximate said lanes and a second upstream location; and a vision system mounted in overhead fashion relative to at least said main conveyor and communication with at least a variable control mechanism for independently adjusting a travel speed of at least one of said main and return conveyors and in order to redirect, along said return conveyor for reintroduction at said upstream location of said main conveyor, a plurality of eggs which exceeds of the present handling capabilities of said individual segregating lanes and spool bar.

* * * * *